(12) United States Patent
Sultan et al.

(10) Patent No.: US 11,155,315 B1
(45) Date of Patent: Oct. 26, 2021

(54) BICYCLE FRAME LIGHTING SYSTEM

(71) Applicant: Jetson Electric Bike LLC, Brooklyn, NY (US)

(72) Inventors: Josh Sultan, Brooklyn, NY (US); Sam Husain, Brooklyn, NY (US)

(73) Assignee: Jetson Electric Bike LLC, Brooklyn, NY (US)

(*) Notice: Subject to any disclaimer, the term of this patent is extended or adjusted under 35 U.S.C. 154(b) by 0 days.

(21) Appl. No.: 17/162,253

(22) Filed: Jan. 29, 2021

(51) Int. Cl.
| | |
|---|---|
| *B62J 6/015* | (2020.01) |
| *F21V 21/08* | (2006.01) |
| *F21V 23/04* | (2006.01) |
| *F21S 9/02* | (2006.01) |
| *F21V 23/02* | (2006.01) |
| *B62J 6/16* | (2020.01) |
| *F21Y 115/10* | (2016.01) |

(52) U.S. Cl.
 CPC ............... *B62J 6/015* (2020.02); *B62J 6/16* (2013.01); *F21S 9/02* (2013.01); *F21V 21/08* (2013.01); *F21V 23/023* (2013.01); *F21V 23/04* (2013.01); *F21Y 2115/10* (2016.08)

(58) Field of Classification Search
 CPC ...... B62J 6/015; B62J 6/16; F21S 9/02; F21V 23/023
 USPC .................................................. 362/473, 474
 See application file for complete search history.

(56) References Cited

U.S. PATENT DOCUMENTS

| | | | | |
|---|---|---|---|---|
| 5,823,653 | A * | 10/1998 | Elam, Jr. ................ | B62J 6/01 362/473 |
| D752,264 | S * | 3/2016 | Talios ..................... | D26/51 |
| 2003/0067782 | A1* | 4/2003 | Niezrecki ............... | B62J 6/20 362/473 |
| 2012/0051072 | A1* | 3/2012 | Yelverton ............... | B62J 6/00 362/473 |
| 2012/0275179 | A1* | 11/2012 | Smith ..................... | B62K 19/40 362/555 |
| 2013/0301285 | A1* | 11/2013 | McCaslin ............... | B62J 6/02 362/473 |
| 2016/0355227 | A1* | 12/2016 | Peterson ................ | B62K 19/40 |
| 2016/0362154 | A1* | 12/2016 | Poole ...................... | B62J 6/01 |

* cited by examiner

*Primary Examiner* — William N Harris
(74) *Attorney, Agent, or Firm* — Meister Seelig & Fein LLP; Seth H. Ostrow, Esq.

(57) ABSTRACT

A bicycle frame lighting system comprising a top light assembly and a bottom light assembly. The top light assembly is assembled to left and right sides of a top tube of a bicycle, wherein the top light assembly includes a pair of top light assembly components that can be detached and re-attached such that top tube is secured between a cavity formed between the top light assembly components. The bottom light assembly is assembled to left and right sides of a bottom tube of the bicycle, wherein the bottom light assembly includes a pair of bottom light assembly components that can be detached and re-attached such that bottom tube is secured between a cavity formed between the bottom light assembly components. The bicycle frame lighting system further comprises a battery housing holding a power source for powering the top light assembly and the bottom light assembly.

20 Claims, 11 Drawing Sheets

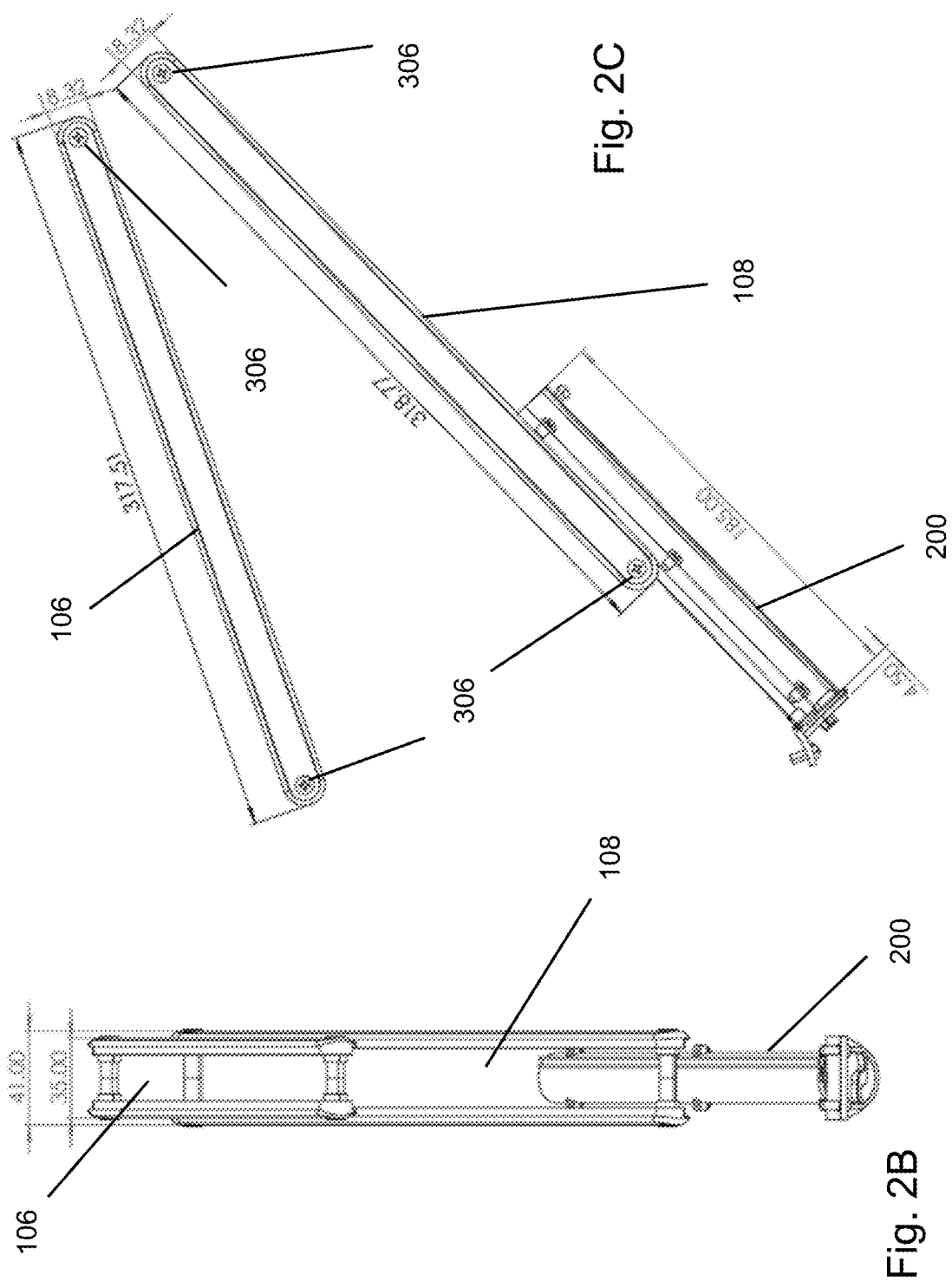

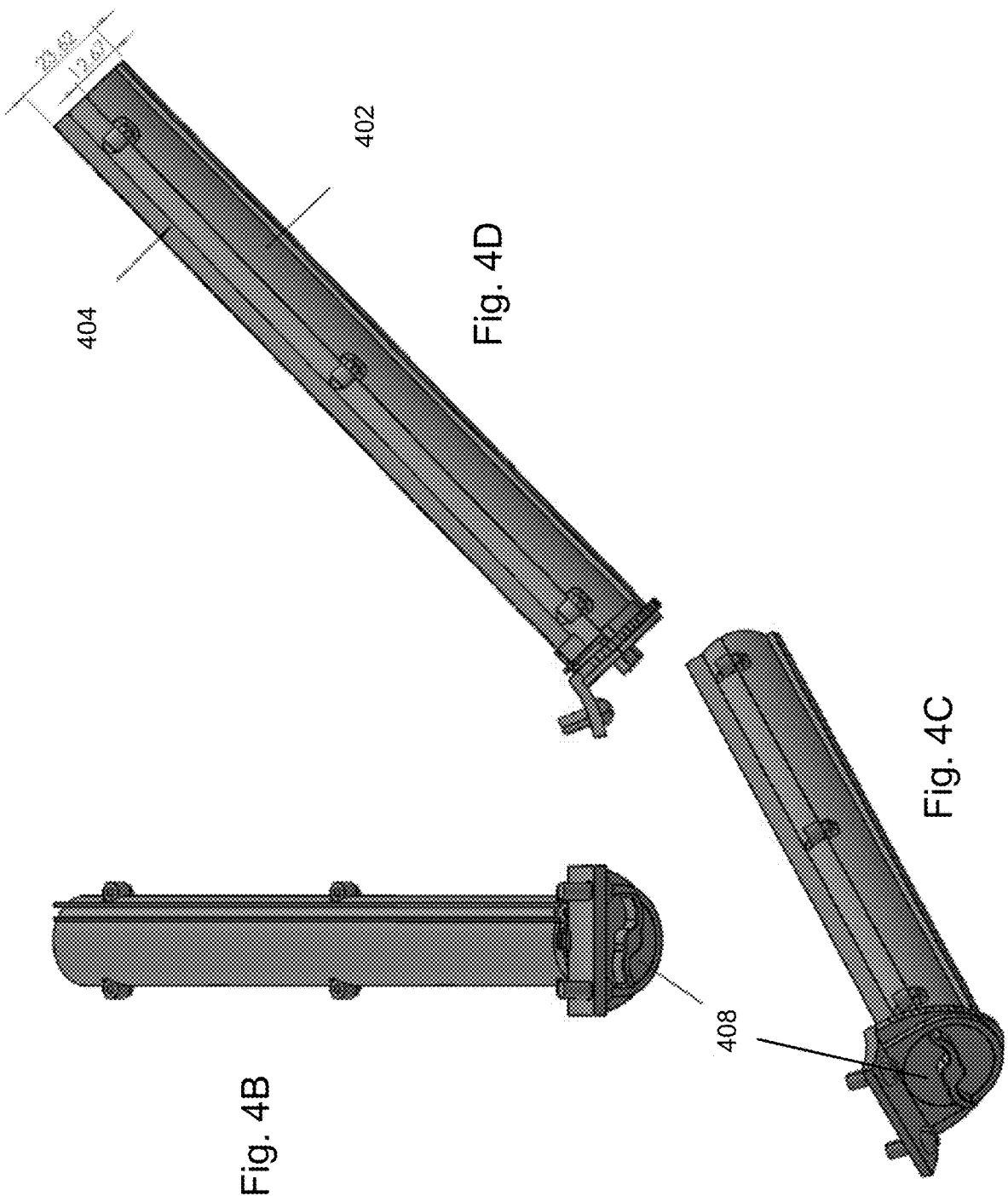

BICYCLE FRAME LIGHTING SYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to bicycle lighting, and in particular, integrating a lighting fixture into a bicycle's frame.

Description of the Related Art

Bicycle lights are used by many bicycle riders to improve their safety and/or visibility. Bicycle lights contribute to rider safety by illuminating their path and increasing the rider's visibility to others at night. However, such lights require a user to mount lights on multiple parts on the exterior of the bicycle, which may be lost or damaged when the bicycle accidentally or intentionally falls to the ground. Many lighting devices related to providing safety lights for bicycles fail to provide a lighting system that is integral within a frame of a bicycle. For example, U.S. Pat. No. 6,779,913 discusses light strips that are adhered by adhesive to a bicycle frame. Attachment of light strips by adhesive and the like are not long-lasting, insecure, flimsy, and can be potentially dangerous if the light strips come loose and are caught in chain of a bicycle. Another shortcoming exists where bicycle lighting requires that the frame of a bicycle be made from translucent materials, as discussed in U.S. Pat. No. 9,944,339. Very few materials are translucent that can be made strong enough to provide sufficient structural integrity for a bicycle frame.

There exists a need for improvements over the prior art and more particularly for a high visibility safety lighting system integrated within the frame or body of a bicycle with little modification to the bicycle frame itself.

SUMMARY OF THE INVENTION

The present invention provides a bicycle frame lighting system. According to one embodiment, the bicycle frame lighting system comprises a top light assembly and a bottom light assembly. The top light assembly is assembled to left and right sides of a top tube of a bicycle, wherein the top light assembly includes a pair of top light assembly components that can be detached from one another and re-attached together such that top tube is secured between a cavity formed between the top light assembly components. The bottom light assembly is assembled to left and right sides of a bottom tube of the bicycle, wherein the bottom light assembly includes a pair of bottom light assembly components that can be detached from one another and re-attached together such that bottom tube is secured between a cavity formed between the bottom light assembly components. The bicycle frame lighting system further comprises a battery housing holding a power source that provides direct current power to the top light assembly and the bottom light assembly.

The bicycle frame lighting system may further comprise securing components that secure the top light assembly to the top tube and the bottom light assembly to the bottom tube. The top light assembly and the bottom light assembly may be configured with respect to slots, recesses, grooves, channels, divots, or pilot holes on the top tube and the bottom tube. In one embodiment, the battery housing is configured at the bottom tube. Alternatively, the battery housing may be configured along at least a portion of a distal end the bottom tube. The battery housing may be attached to the bottom light assembly. The complementary light assembly components may include attachment points at distal ends of the complementary light assembly components. The bicycle frame lighting system may further comprise a switch or circuitry that toggles power to the top light assembly and the bottom light assembly. The switch or circuitry may be configured on a handlebar of the bicycle or the top tube.

The top light assembly and the bottom light assembly may include a plurality of light emitting diode lights. The switch or circuitry may control operation of the plurality of light emitting diode lights to strobe, blink, turn on, or operate in a pattern. In one embodiment, the top light assembly and the bottom light assembly include assembly component covers that encase the plurality of light emitting diode lights. The assembly component cover may include a plastic covering that is clear or tinted. The plurality of light emitting diode lights individually or collectively produce light of any color.

The battery housing may include a bottom shell, a top shell, and a battery housing chamber. The power source may be inserted within the battery housing chamber. The battery housing chamber may include a battery housing cap. The power source may be a battery unit.

According to another embodiment, the bicycle frame lighting system comprises a top light assembly that is assembled to left and right sides of a top tube of a bicycle wherein the top light assembly includes a pair of top light assembly components that are removably attached to the top tube. The bicycle frame lighting system further comprises a bottom light assembly that is assembled to left and right sides of a bottom tube of the bicycle wherein the bottom light assembly includes a pair of bottom light assembly components that are removably attached to the bottom tube. The bicycle frame lighting system further comprises a battery housing holding a power source that provides direct current power to the top light assembly and the bottom light assembly. The top light assembly components and the bottom light assembly components comprise low-profile decal stickers including light emitting diode lights.

The bicycle frame lighting system may further comprise a switch or circuitry that toggles power to the top light assembly and the bottom light assembly. The switch or circuitry may control operation of the light emitting diode lights to strobe, blink, turn on, or operate in a pattern.

BRIEF DESCRIPTION OF THE DRAWINGS

The invention is illustrated in the figures of the accompanying drawings which are meant to be exemplary and not limiting, in which like references are intended to refer to like or corresponding parts.

FIGS. 2A through 2C illustrate a plurality of views of a bicycle frame lighting system according to an embodiment of the present invention.

FIGS. 4A through 4D and 5 illustrate a battery housing according to an embodiment of the present invention.

DETAILED DESCRIPTION OF THE INVENTION

Figure 1A:
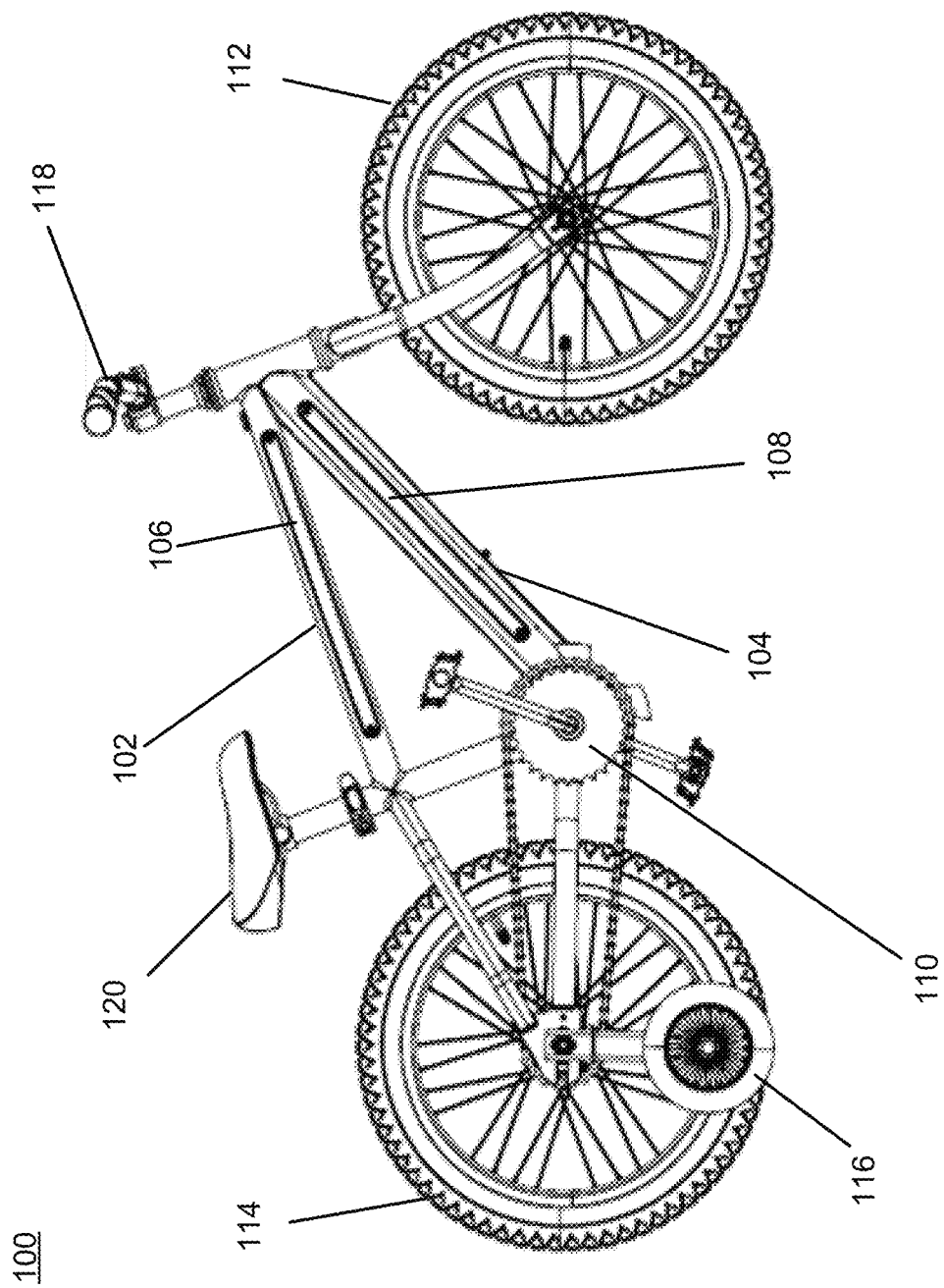
FIGS. 1A through 1D illustrate a plurality of views of a bicycle according to an embodiment of the present invention.
Figure 1B:
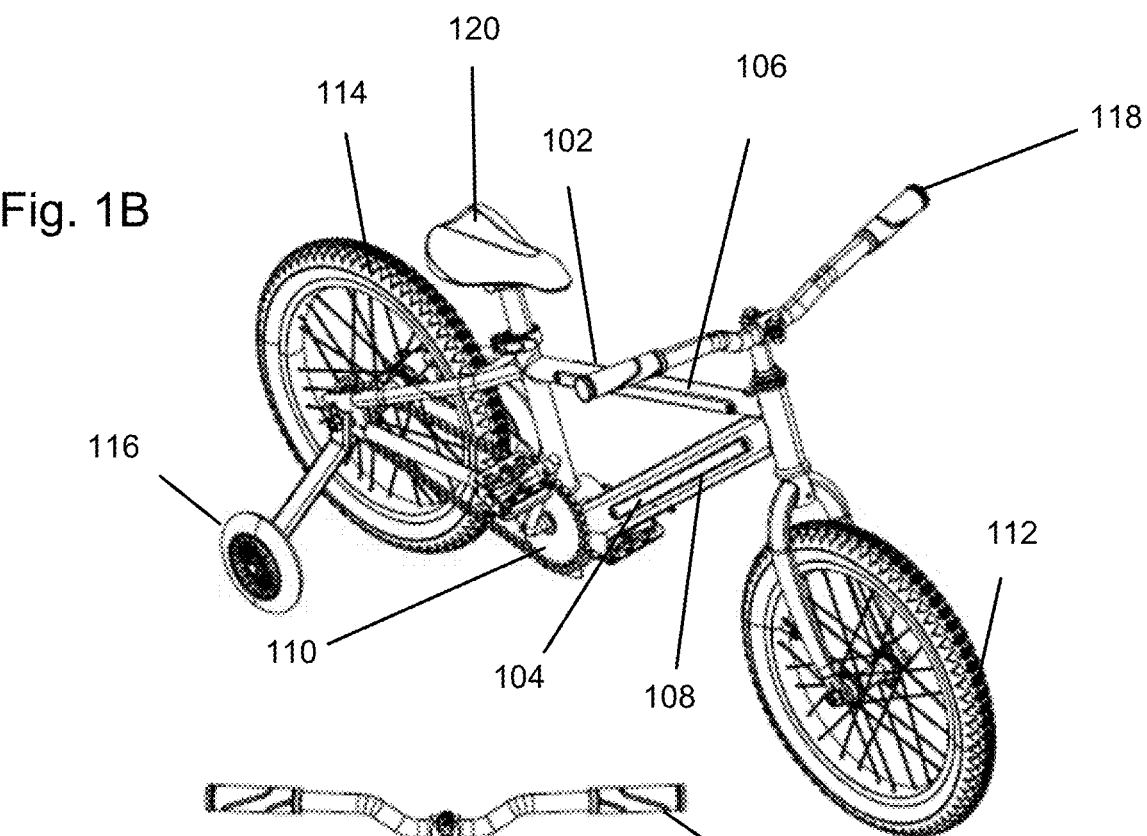
Figure 1C:
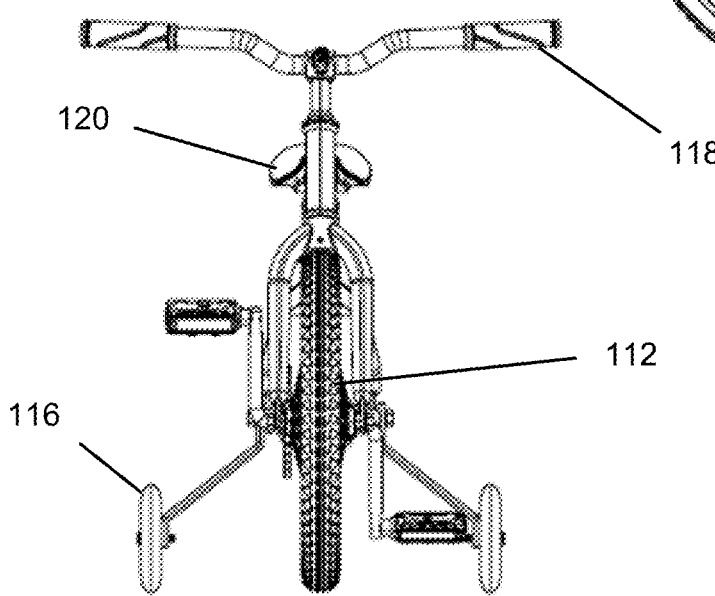
Figure 1D:
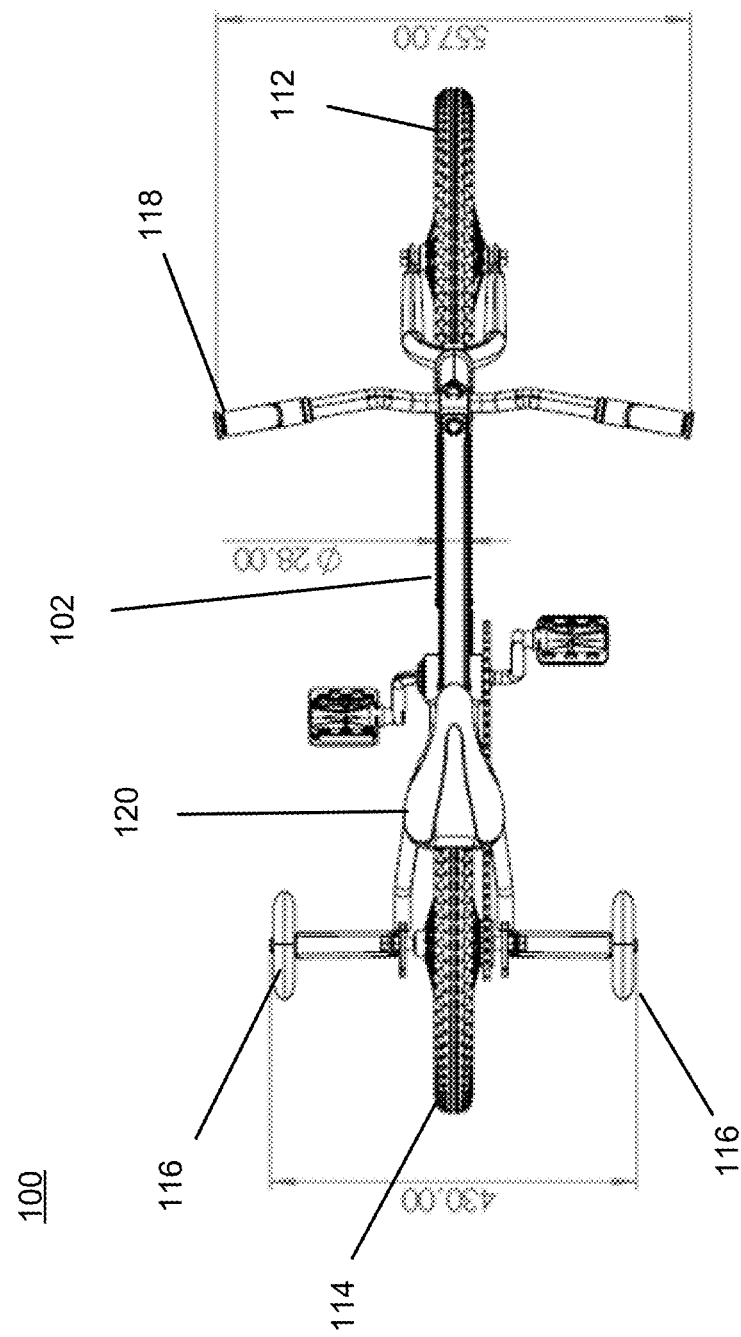

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. The following detailed description is, therefore, not intended to be taken in a limiting sense.

FIGS. 1A through 1D present various views of a bicycle according to an embodiment of the present invention. Bicycle 100 includes a top tube 102, bottom tube 104, chain ring assembly 110, front wheel 112, rear wheel 114, training wheels 116, handlebar 118, and seat post 120. The bicycle 100 may further include a bicycle frame lighting system for illuminating the frame of bicycle 100. The bicycle frame lighting system may include a top light assembly 106 that is assembled to the left and right sides of top tube 102 and a bottom light assembly 108 that is assembled to the left and right sides of bottom tube 104. In other embodiments, light assemblies may be configured on other parts of the bicycle frame, such as the seat tube, head tube, seat stays, chain stays, etc.

The top tube 102 and the bottom tube 104 may be hollow inside defining a cavity adapted to receive securing components, such as screws, bolts, or fasteners well known to those skilled in the art that may be used for securing the top light assembly 106 and bottom light assembly 108, respectively. Each of the top tube 102 and the bottom tube 104 can be made from material comprising steel, high performance alloys, aluminum alloys, titanium, carbon fiber, or any combinations thereof. In other embodiments, each of the top tube 102 and the bottom tube 104 can be formed for adapting with the top light assembly 106 and the bottom light assembly 108, respectively, such as slots, recesses, grooves, channels, divots, pilot holes, etc. According to yet another embodiment, top light assembly 106 and bottom light assembly 108 may be constructed as illuminating (via light emitting diode lights) decal stickers that can be wrapped around the top tube 102 or bottom tube 104.

A power source providing electricity to the top light assembly 106 and the bottom light assembly 108 may be installed within the bottom tube 104, encapsulated over the bottom tube 104, or adjacent along at least a portion of a distal end the bottom tube 104 at the chain ring assembly 110. Bicycle 100 may further comprise auxiliary equipment (not illustrated), e.g., speakers, that can also be powered by the power source. In certain embodiment, the chain ring assembly 110 may include a chain ring guard. However, in other embodiments, the power source may be attached or coupled to various parts of the bicycle.

Figure 2A:
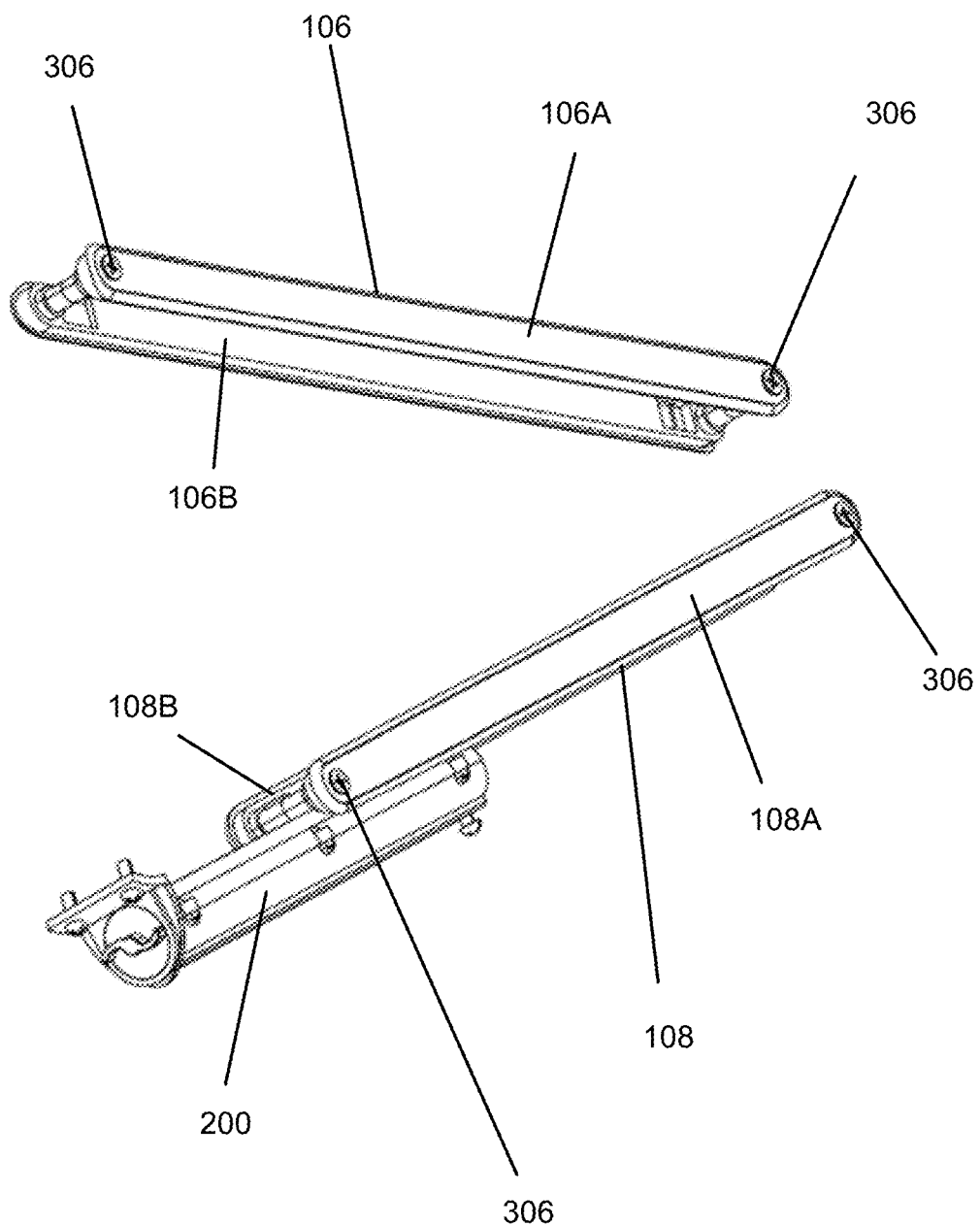

FIGS. 2A through 2C present various views of a bicycle frame lighting system according to an embodiment of the present invention. The presently disclosed bicycle frame lighting system may include top light assembly 106, bottom light assembly 108, and battery housing 200. Battery housing 200 is capable of holding a power source, such as a battery pack that provides direct current power to energize top light assembly 106 and bottom light assembly 108. The bicycle frame lighting system may further include a switch and/or circuit that may be placed at a given location on the bicycle, such as at the handlebar 118 or on the top tube 102, to toggle power to one of or both the top light assembly 106 and the bottom light assembly 108. The switch and/or circuit may also toggle power to auxiliary equipment, either separately or in conjunction with top light assembly 106 and the bottom light assembly 108. Top light assembly 106 and bottom light assembly 108 may be connected to the power source via an insulated cable or wire. In one embodiment, the battery housing 200 may be attached to the bottom light assembly 108.

According to embodiments of the present invention, the disclosed bicycle frame lighting system includes attachment mechanisms that allows for seamless integration with any bicycle that is more secure and streamlined compared to prior bicycle lighting systems. Top light assembly 106 may include top light assembly component 106A and top light assembly component 106B that can be detached from one another and re-attached together such that top tube 102 is secured between a cavity formed between the top light assembly components 106A and 106B. Similarly, bottom light assembly 108 may include bottom light assembly component 108A and bottom light assembly component 108B that can be detached from one another and re-attached together such that bottom tube 104 is secured between a cavity formed between the bottom light assembly components 108A and 108B. The light assembly components may be secured to each other at attachment points 306 on both ends (distal) of the light assembly component to provide a clamp with the bicycle tube sections. In an alternative embodiment, the light assembly components may comprise low-profile decal stickers including light emitting diode lights that can be adhered along the sides of the top tube 102 and bottom tube 104 in a seamless fashion.

Figure 3:
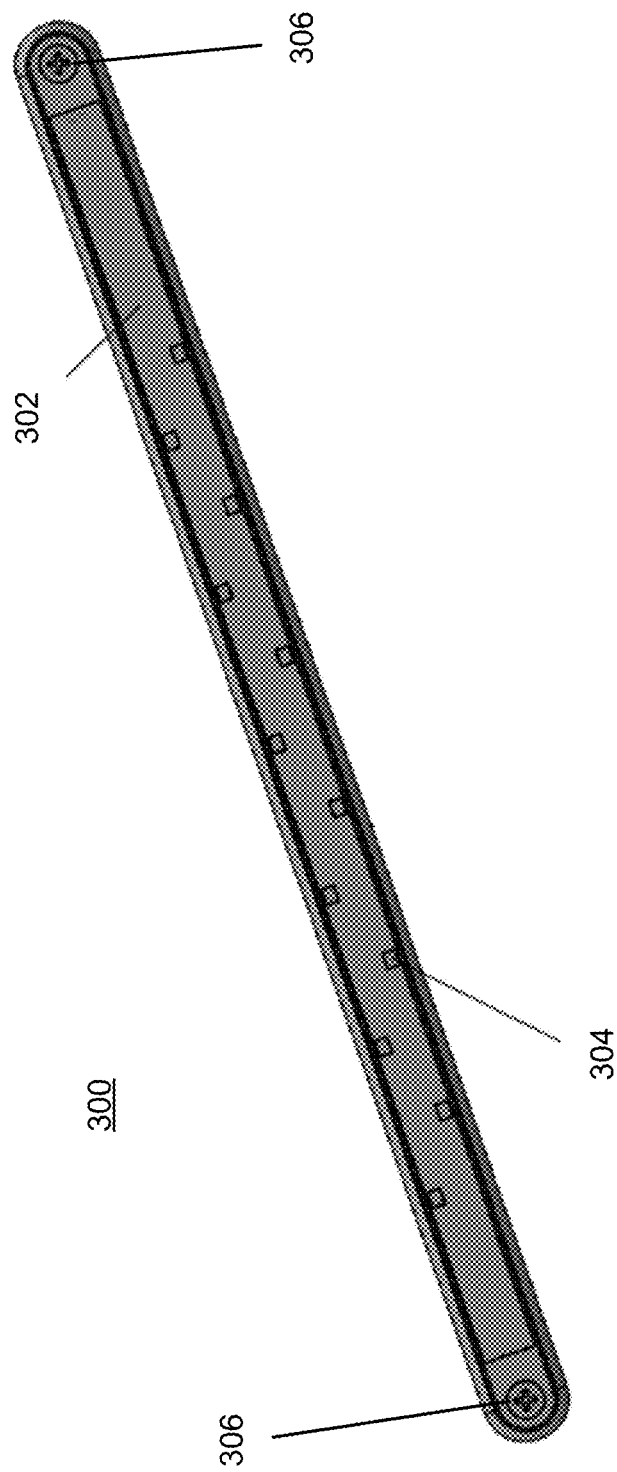
FIG. 3 illustrates a light assembly component according to an embodiment of the present invention.

Referring to FIG. 3, an exemplary assembly component 300 may include a plurality of light emitting diode lights 304 and an assembly component cover 302 that encases and protects the plurality of light emitting diode lights 304. The plurality of light emitting diode lights 304 may individually or collectively produce light of any color that may be varied either manually or via digital circuitry. According to another embodiment, the plurality of light emitting diode lights 304 may be programmed to operate in certain modes, such as strobing, blinking, turning on light emitting diode lights on one or more light assembly components, lighting up certain light emitting diode lights on the light assembly components, or lighting up certain light emitting diode lights in a pattern. The assembly component cover 302 may comprise, for example, a plastic covering that is clear or tinted with any color such that light from the plurality of light emitting diode lights 304 can be visually seen.

Figure 4A:
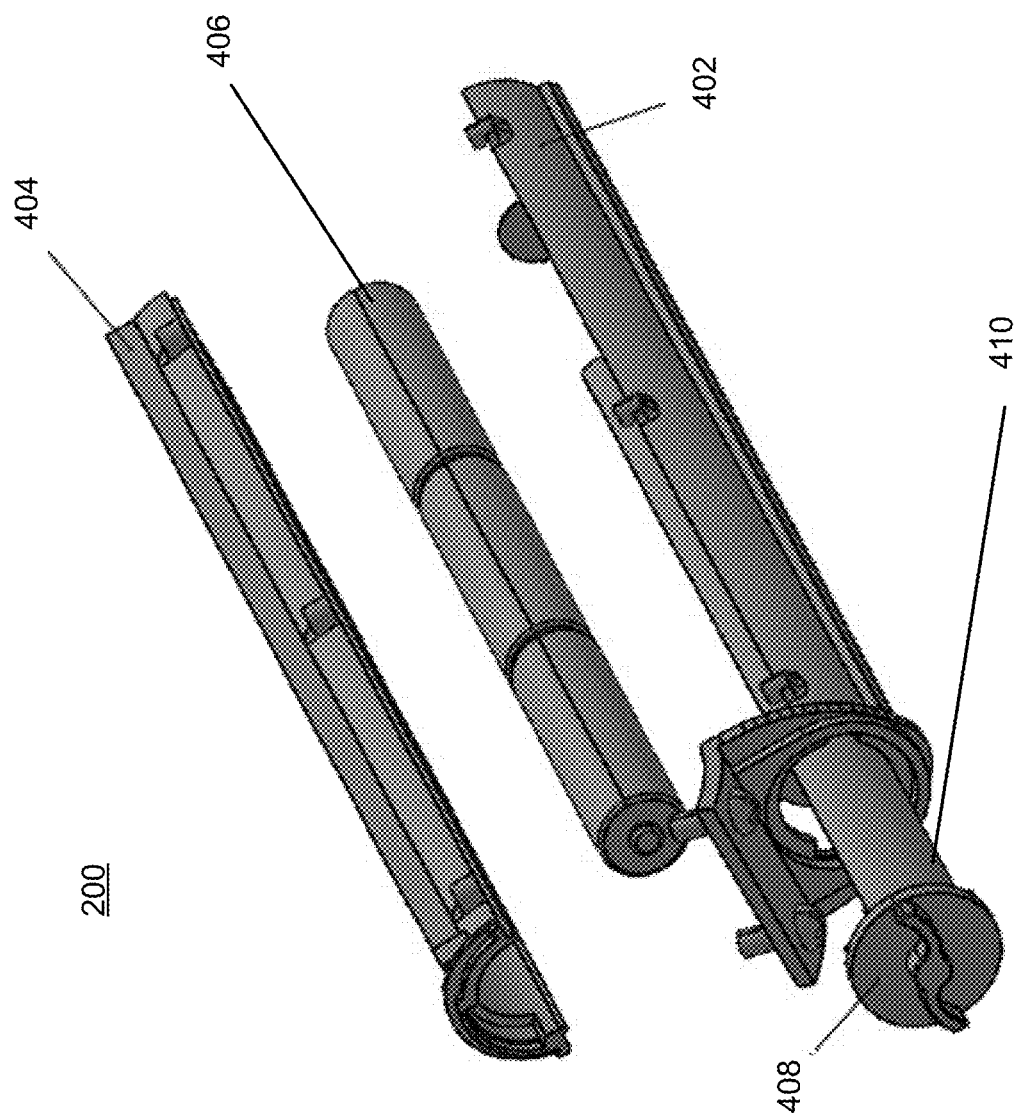
Figure 5:
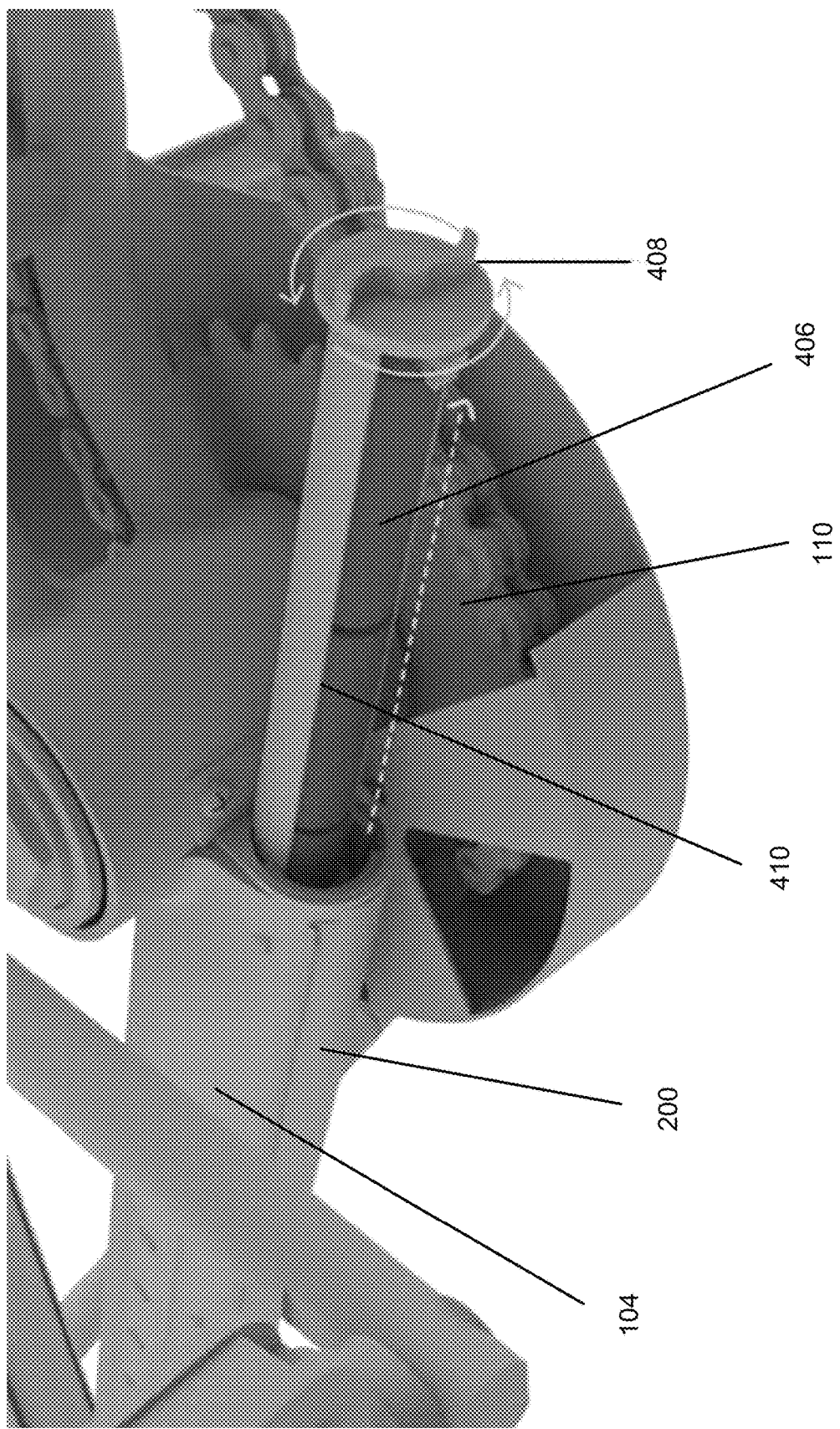

FIGS. 4 and 5 illustrate a battery housing of the bicycle frame lighting system according to an embodiment of the present invention. Battery housing 200 may comprise a bottom shell 402 and a top shell 404 encapsulating a battery housing chamber 410. Battery housing chamber 410 may contain a battery 406 which serves as a power source. The battery 406 may be a battery pack, a plurality of batteries, a single battery, rechargeable or not rechargeable, or any combination thereof. Battery 406 may be sized such that it may be inserted within the battery housing chamber 410. The bottom shell 402 and top shell 404 may be formed in a tubular shape and from material comprising plastic, metal, alloys, carbon fiber, or any other suitable as recognized by those skilled in the art. In the illustrated embodiment, the battery 406 is cylindrically shaped, however other shapes may also be used and are within the spirit and scope of the presently disclosed system. Battery housing chamber 410 may be accessed by rotating and protracting battery housing cap 408 from the battery housing 200, as illustrated in FIG. 5.

Figure 6:
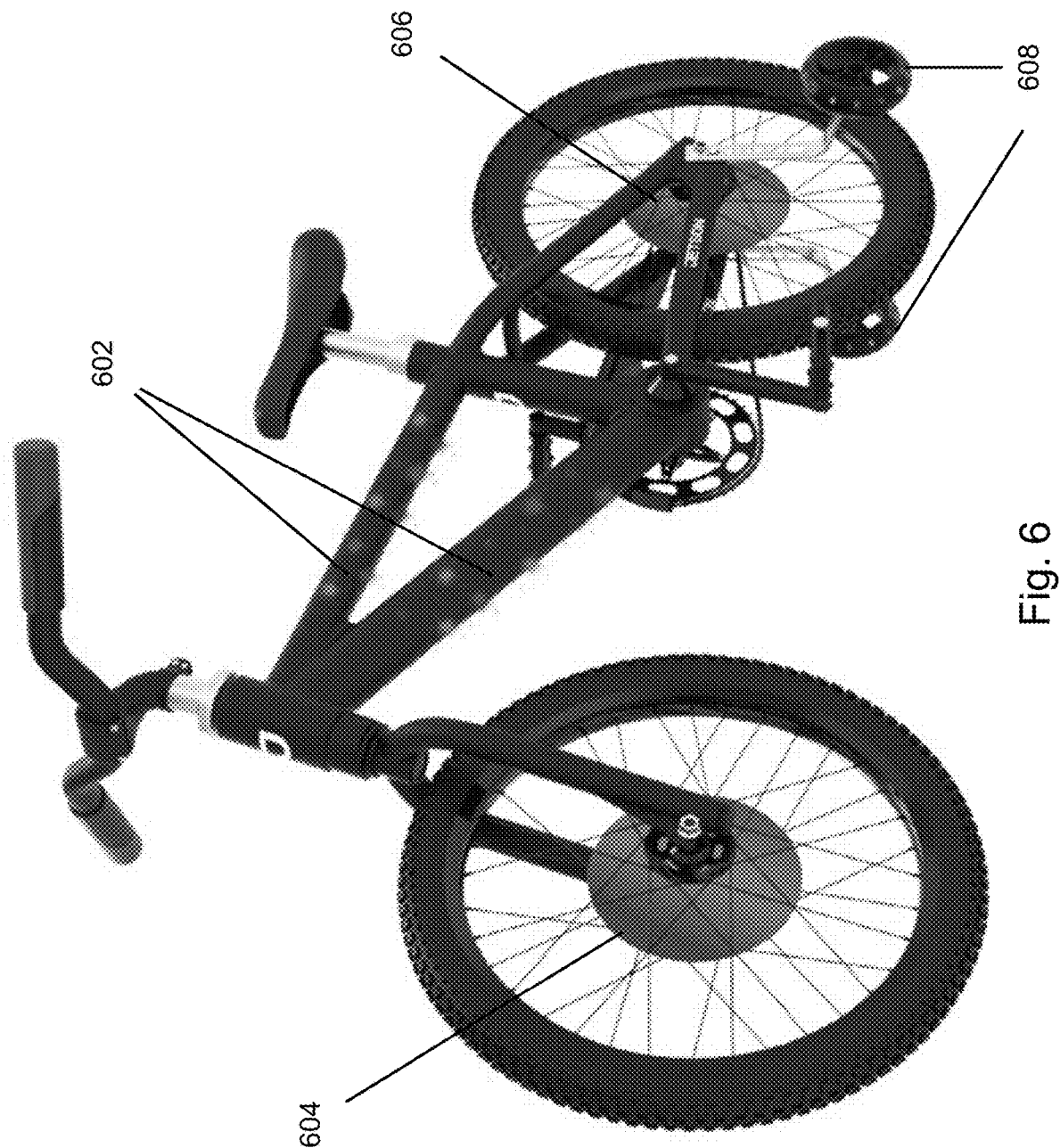
FIGS. 6 and 7 illustrate exemplary renderings of bicycles including bicycle frame lighting systems according to alternative embodiments of the present invention.

FIG. 6 presents an exemplary rendering of a bicycle including a bicycle frame lighting system according to another embodiment of the present invention. The depicted bicycle may be configured with a bicycle frame lighting system including frame lighting 602, front wheel disc lighting 604, rear wheel disc lighting 606, and training wheels lighting 608. Frame lighting 602 may be configured on, for example, the top and bottom tubes, but may also be configured on any portion of the frame of the bicycle. Frame lighting 602, front wheel disc lighting 604, rear wheel disc lighting 606, and training wheels lighting 608 may include colored light emitting diode lights that are electrically connected either collectively or individually to one or more power sources (e.g., battery housing) and connected to a common switch or individual switches for selectively toggling each individual lighting component.

Figure 7:

FIG. 7 presents an exemplary rendering of a bicycle including a bicycle frame lighting system according to yet another embodiment of the present invention. The depicted bicycle may be configured with a bicycle frame lighting system including frame lighting 702, front wheel rim lighting 704, and rear wheel rim lighting 706. Frame lighting 702 may be configured on, for example, the top and bottom tubes, but may also be configured on any portion of the frame of the bicycle. The frame lighting 702, front wheel rim lighting 704, and rear wheel rim lighting 706 may include colored light emitting diode lights that are electrically connected either collectively or individually to one or more power sources (e.g., battery housing) and connected to a common switch or individual switches for selectively toggling each individual lighting component.

FIGS. 1 through 7 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A bicycle frame lighting system comprising:
    a top light assembly that is assembled to left and right sides of a top tube of a bicycle, the top light assembly including a pair of top light assembly components that are removably attached to the top tube wherein the top tube is secured between a cavity formed between the top light assembly components;
    a bottom light assembly that is assembled to left and right sides of a bottom tube of the bicycle, the bottom light assembly including a pair of bottom light assembly components that are removably attached to the bottom tube wherein the bottom tube is secured between a cavity formed between the bottom light assembly components; and
    a battery housing holding a power source that provides direct current power to the top light assembly and the bottom light assembly.

2. The bicycle frame lighting system of claim 1 further comprising securing components that secure the top light assembly to the top tube and the bottom light assembly to the bottom tube.

3. The bicycle frame lighting system of claim 1 wherein the top light assembly and the bottom light assembly are configured with respect to slots, recesses, grooves, channels, divots, or pilot holes on the top tube and the bottom tube.

4. The bicycle frame lighting system of claim 1 wherein the battery housing is configured at the bottom tube.

5. The bicycle frame lighting system of claim 1 wherein the battery housing is configured along at least a portion of a distal end the bottom tube.

6. The bicycle frame lighting system of claim 1 wherein the battery housing is attached to the bottom light assembly.

7. The bicycle frame lighting system of claim 1 wherein the light assembly components include attachment points at distal ends of the light assembly components.

8. The bicycle frame lighting system of claim 1 further comprising a switch or circuitry that toggles power to the top light assembly and the bottom light assembly.

9. The bicycle frame lighting system of claim 8 wherein the switch or circuitry is configured on a handlebar of the bicycle or the top tube.

10. The bicycle frame lighting system of claim 8 wherein the top light assembly and the bottom light assembly include a plurality of light emitting diode lights.

11. The bicycle frame lighting system of claim 10 wherein the wherein the switch or circuitry controls operation of the plurality of light emitting diode lights to strobe, blink, turn on, or operate in a pattern.

12. The bicycle frame lighting system of claim 10 wherein the top light assembly and the bottom light assembly include assembly component covers that encase the plurality of light emitting diode lights.

13. The bicycle frame lighting system of claim 12 wherein the assembly component cover includes a plastic covering that is clear or tinted.

14. The bicycle frame lighting system of claim 10 wherein the plurality of light emitting diode lights individually or collectively produce light of any color.

15. The bicycle frame lighting system of claim 1 wherein the battery housing includes a bottom shell, a top shell, and a battery housing chamber.

16. The bicycle frame lighting system of claim 15 wherein the power source is inserted within the battery housing chamber.

17. The bicycle frame lighting system of claim 15 wherein the battery housing chamber includes a battery housing cap.

18. A bicycle frame lighting system comprising:
- a top light assembly that is assembled to left and right sides of a top tube of a bicycle, the top light assembly including a pair of top light assembly components that are removably attached to the top tube;
- a bottom light assembly that is assembled to left and right sides of a bottom tube of the bicycle, the bottom light assembly including a pair of bottom light assembly components that are removably attached to the bottom tube; and
- a battery housing holding a power source that provides direct current power to the top light assembly and the bottom light assembly,
- wherein the top light assembly components and the bottom light assembly components comprise light emitting diode lights.

19. The bicycle frame lighting system of claim 17 further comprising a switch or circuitry that toggles power to the top light assembly and the bottom light assembly.

20. The bicycle frame lighting system of claim 17 wherein the switch or circuitry controls operation of the light emitting diode lights to strobe, blink, turn on, or operate in a pattern.

\* \* \* \* \*